United States Patent [19]

Walters et al.

[11] Patent Number: 5,282,591
[45] Date of Patent: Feb. 1, 1994

[54] ACTIVE VORTEX CONTROL FOR A HIGH PERFORMANCE WING

[75] Inventors: Marvin M. Walters, Lansdale; Steven B. Kern, Holland, both of Pa.

[73] Assignee: The United States of America as represented by the Secretary of the Navy, Washington, D.C.

[21] Appl. No.: 994,229

[22] Filed: Dec. 21, 1992

[51] Int. Cl.⁵ .............................................. B64C 23/06
[52] U.S. Cl. .................................. 244/199; 244/198; 244/218; 244/49
[58] Field of Search ............... 244/198, 199, 201, 218, 244/46, 49, 87

[56] References Cited

U.S. PATENT DOCUMENTS

| | | | |
|---|---|---|---|
| 3,456,905 | 7/1969 | Bielefeldt | 244/218 |
| 3,572,617 | 3/1971 | Ricard | 244/218 X |
| 3,645,477 | 2/1972 | Kratschmar et al. | 244/46 |
| 4,132,375 | 1/1979 | Lamar | 244/218 X |
| 4,267,990 | 5/1981 | Staudacher | 244/199 X |
| 4,738,479 | 4/1988 | Filtri et al. | 244/199 X |
| 4,739,957 | 4/1988 | Vess et al. | 244/199 |

Primary Examiner—Karin L. Tyson
Assistant Examiner—Christopher P. Ellis
Attorney, Agent, or Firm—James V. Tura; James B. Bechtel; Susan E. Verona

[57] ABSTRACT

An on-demand wing vortex control system includes a pair of retractable panels which extend forward through slots in the leading edges of the strake and main wing at their junction. When not in use, the device is retracted in a stowed position, thus having zero impact on the cruise efficiency and observability characteristics designed into the aircraft. The panels extend forward from the strake and wing, providing an added leading edge airfoil surface when in the deployed position. Both panels are slideably and rotatably affixed to the aircraft. A front panel is affixed to and supported within the strake, while a rear panel is affixed and supported within the main wing. The planform of each panel is symmetrically identical, and the movements of the panels are mechanically coordinated so that the exposed planform shape represented by the combined overlapping panels are symmetrical about a line which bisects the strake/wing junction angle. The panels may be deployed in a variety of positions which control the strength and location of the vortex and its burst point as it is shed over the wing, thereby altering the lift on the aircraft.

10 Claims, 8 Drawing Sheets

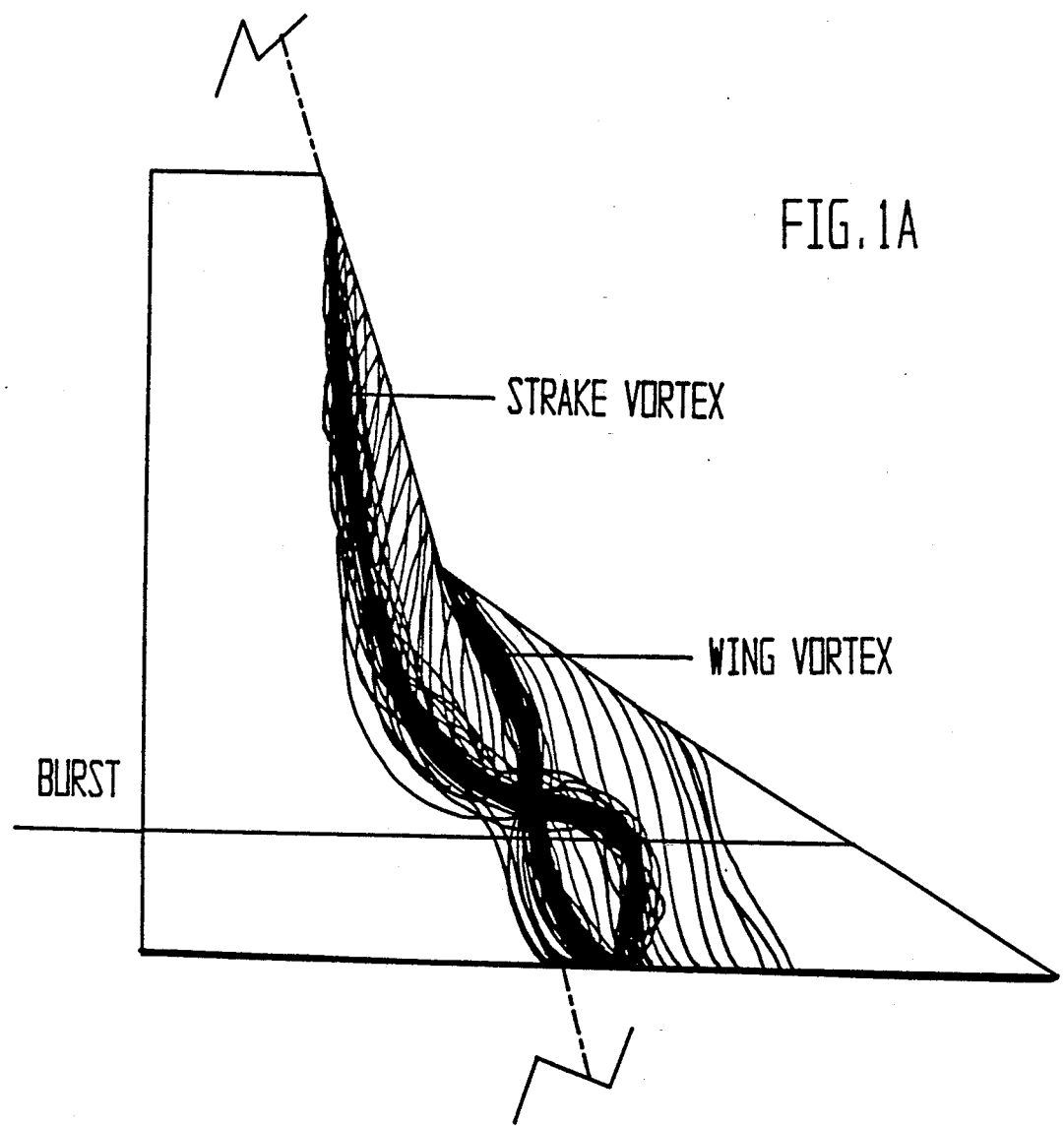

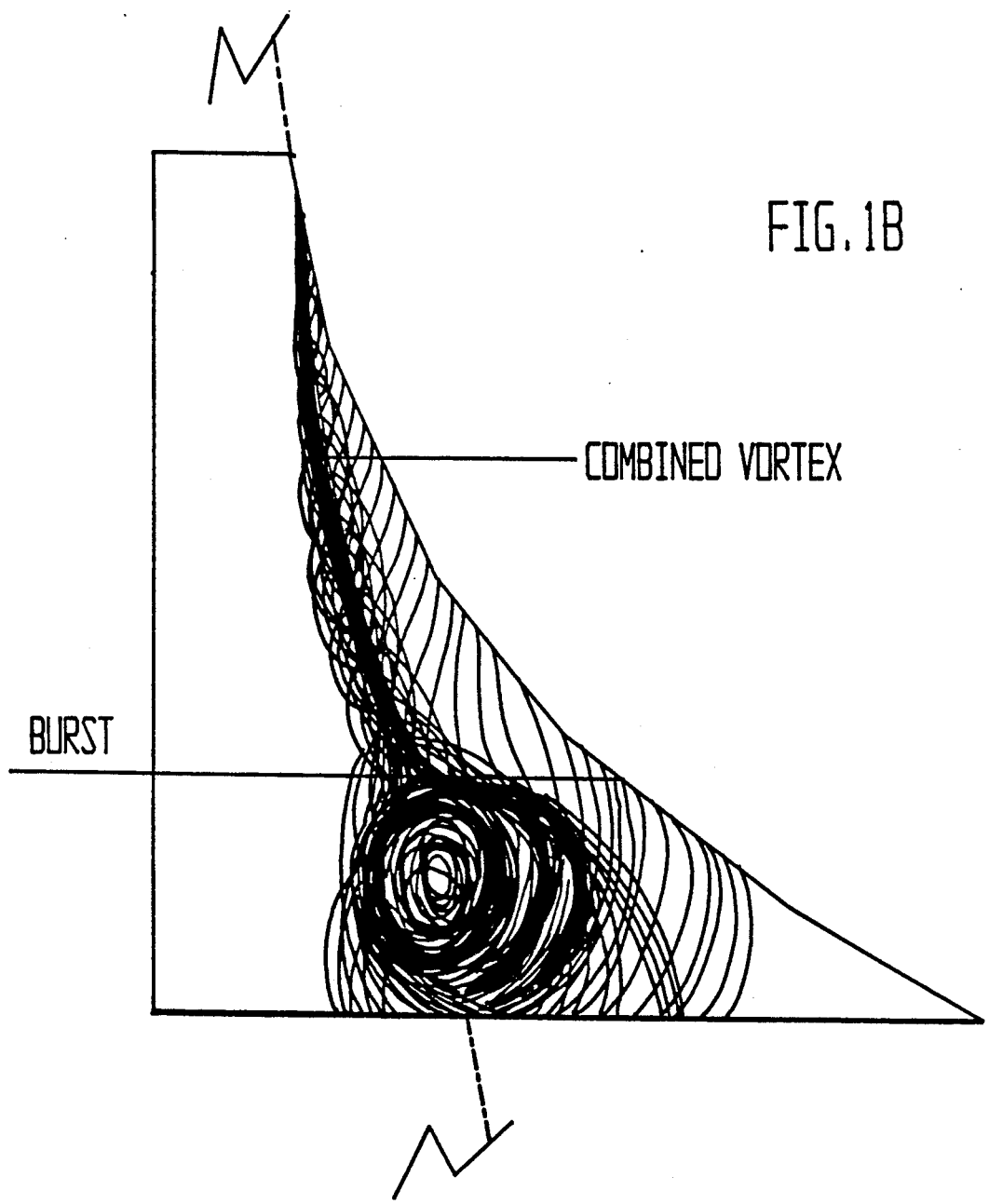

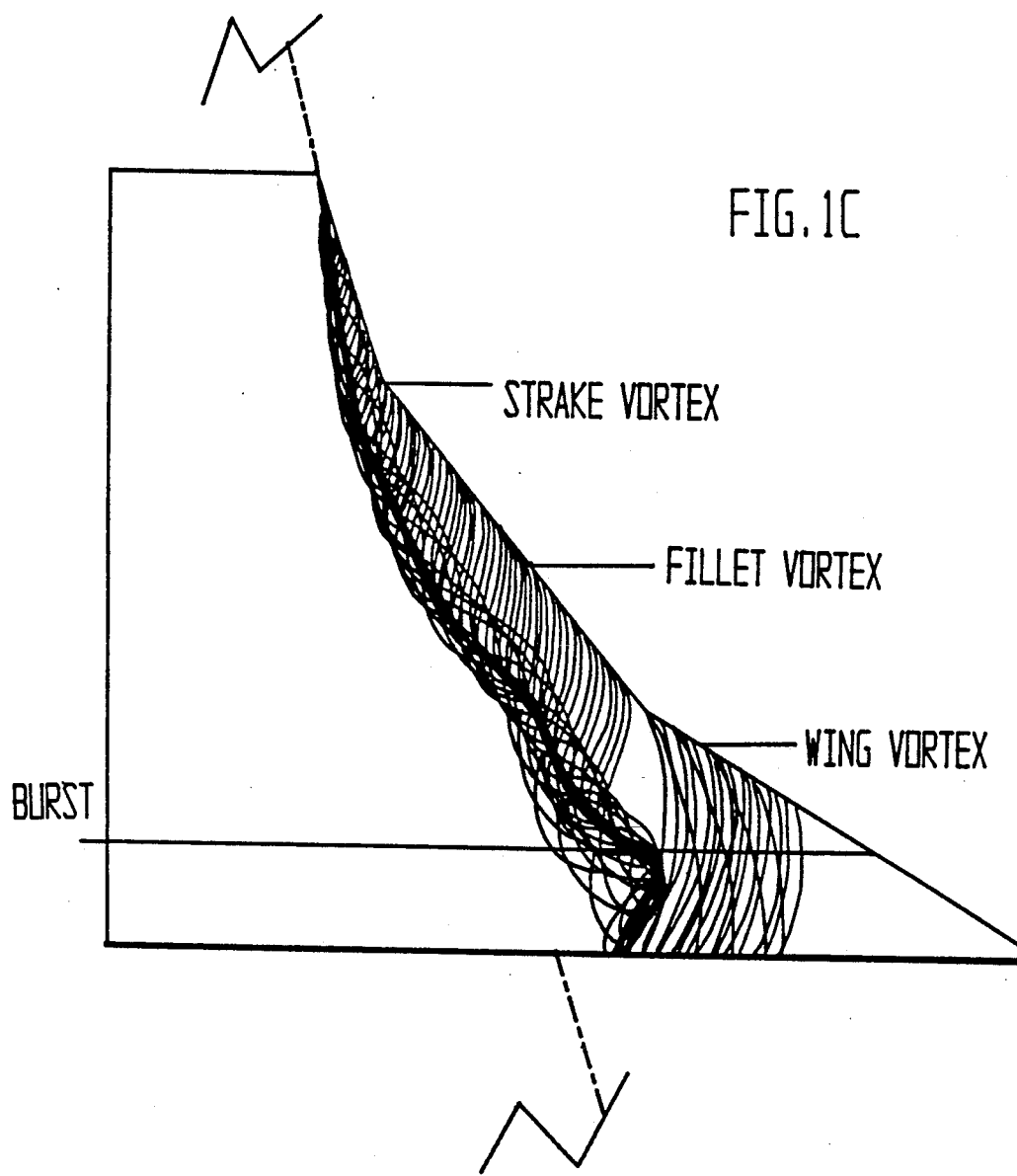

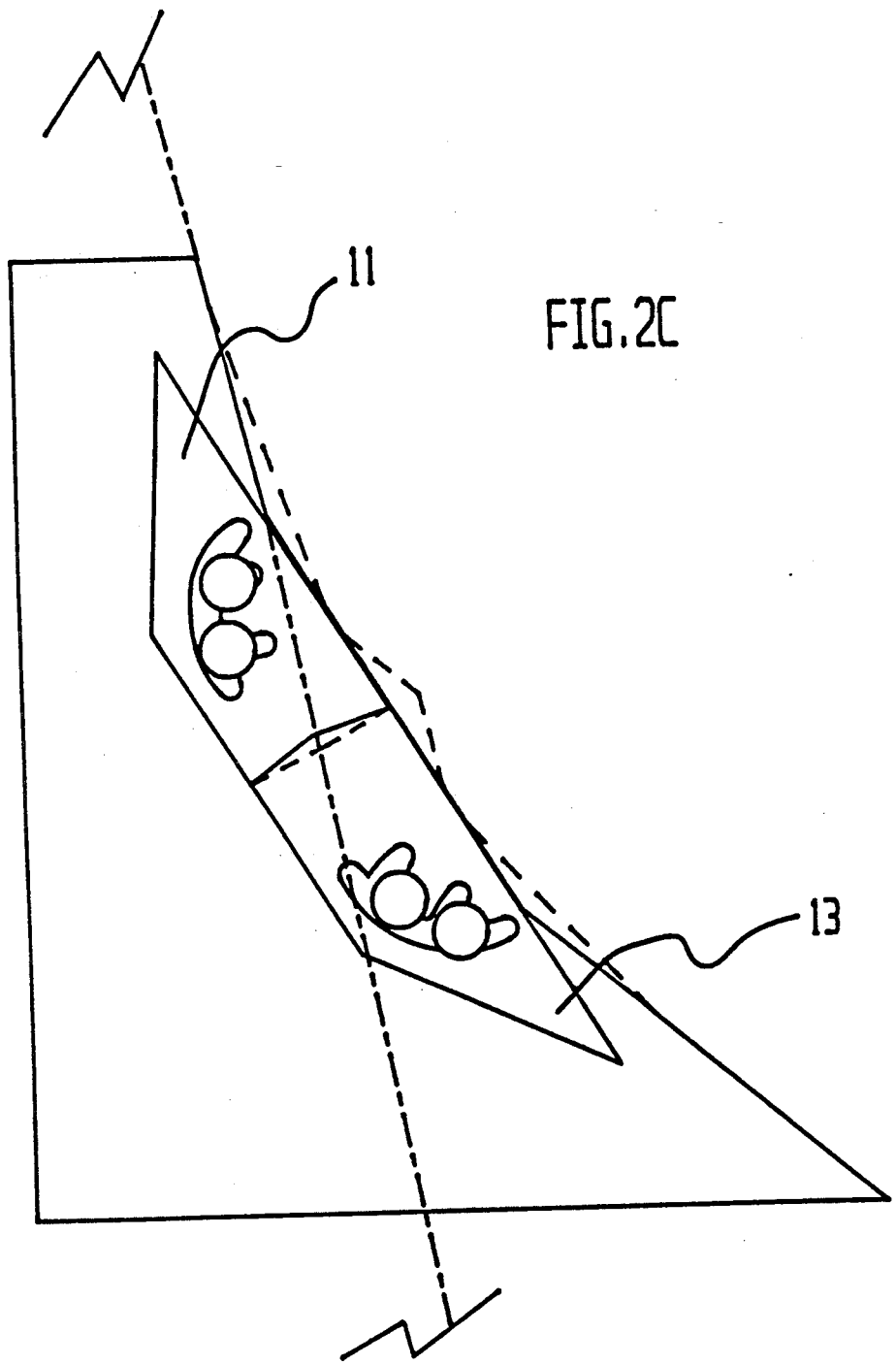

ACTIVE VORTEX CONTROL FOR A HIGH PERFORMANCE WING

STATEMENT OF GOVERNMENT INTEREST

The invention described herein may be manufactured and used by or for the Government of the United States of America for governmental purposes without the payment of any royalties thereon or therefor.

FIELD OF THE INVENTION

This invention relates to vortex control for lifting wing surfaces, such as those used on aircraft. More specifically, it relates to an active vortex control system for a high performance wing.

BACKGROUND OF THE INVENTION

Airplane wings represent lifting surfaces in a flow field. Under normal operating conditions, the lift on such wings is due primarily to the large-bound vortices which appear on the low pressure side of the wing. The strength and size of the vortices depend upon their velocity, angle of attack, sweep angle, etc. The lift on the wing also depends on other characteristics of the vortex, including its trajectory, strength, and location of the vortex burst point (i.e. the point at which the vortex becomes unstable due to reaching certain critical limits of its characteristics). In lifting surfaces, it is desirable to control the lift of the surface. This will aid in, for example, the degree of maneuverability of a fighter plane. A number of devices have been proposed to control the lifting surfaces by altering the vortices to provide a vortex lift control system.

Essentially, vortex lift control systems involve stabilizing the vortex shed from the leading edge of the wing so as to direct the leading edge vorticity along the direction of the wing. Lift control is dependent upon the vortex burst point. At the location of the vortex burst, the wing lift is severely reduced. It is therefore desirable to delay vortex burst and thereby increase the wing lift.

A number of devices have been proposed to control the shedding of vortices at the leading edges of the wings. These include additional wings mounted on the aircraft fuselage ahead of the wing, and the use of tuned cavities on the leading edge of the wing. U.S. Pat. No. 4,697,769, issued to Ron F. Blackwelder et al. on Oct. 6, 1987, discloses the method and apparatus for controlling bound vortices in the vicinity of lifting surfaces. This patent discloses a piston and cylinder located in a slot of the leading edge of a delta wing in order to create a natural resonance similar to the shedding rate of the discrete vortices. Alternate embodiments disclosed in this document teach the use of audio speakers substituted for the piston, or the slot can be eliminated and a piezoelectric array embedded in the air flow to provide the disturbance. U.S. Pat. No. 4,569,494, issued to Sumio T. Sakata on Feb. 11, 1986, discloses a method for pitch control of swept wing aircraft which utilizes a fixed position vane mounted directly to the fuselage forwardly of the wings to enhance vortex formulation.

While these structures have been proposed, none have achieved a degree of active controllability that makes them practical. The permanent structures that have been proposed as passive vortex control systems adversely affect the other aspects of the aircraft's aerodynamic performance, since they are permanently deployed and may foul the air flow at different speeds.

SUMMARY OF THE INVENTION

The present invention provides on-demand control of vortices shed from moderate-to-highly swept wings. Control can take the form of changes in vortex trajectory, strength or location of burst point, in addition to the possible elimination of the vortex. This device includes deployable aerodynamic surfaces in the form of a pair of retractable vanes or panels which extend forward through a slot in the leading edges of the strake and wing at their angular junction. When not in use, the device is retracted in a stowed position, thus having zero impact on the cruise efficiency and observability characteristics designed into the aircraft. This represents a major advantage of the present invention over the prior art vortex control systems.

The present vortex control system has been developed from research conducted by the inventors that demonstrates that small geometry changes at the strake/wing junction point of a delta wing can significantly alter the original vortex shedding process. It has further been observed that the effect on the vortex is dependent on the shape changes in the angular space between the strake and the wing. As further described herein, the stowable, overlapping panels of the invention provide the desired wing-shape change at this location and, thus, provide the desired vortex control.

FIGS. 1A through 1D illustrate four different strake/wing junction planforms and their effect on the air flow vortex shedding process. FIG. 1A shows the baseline strake/wing junction in its original unaltered condition and the flow that results. As shown in FIG. 1B, a continuous transition from the strake to the wing results in a stronger vortex compared to FIG. 1A being shed, since the junction has now been eliminated. This stronger vortex results in a burst point closer to the apex of the wing. As seen in FIG. 1C, a simple straight line transition from the strake to the wing results in an additional junction being created relative to the baseline configuration (FIG. 1A). In this case, an additional weaker vortex results in a delay of the burst point as shown. In FIG. 1D, a third configuration provides a diamond-shaped fillet, which adds yet another junction. This results in a second additional vortex being shed, but it is even weaker than the previous one; therefore, delaying the burst point even farther.

These observations with regard to the geometries illustrated above have resulted in the use of the deployable panels provided by the invention which achieve these structural shapes. The panels may assume at least these four positions, which in order of the extent of their deployment are as follows: (1) a retracted or stowed position in which there has been no alteration to the original strake/wing junction; (2) a second position in which the leading edges of both the strake and the wing have been extended to increase the included angle between the wing and strake so as to make the transition between the strake and wing more continuous; (3) a third position in which the strake/wing junction has been filled by a triangular shape which provides a straight line transition between the leading edges of the strake and the wing; and (4) a fourth position in which a diamond-shaped fillet is created which promotes the shedding of three vortices as described above with regard to FIG. 1D. As seen from these figures, once the panels are deployed, the vortex burst initially strengthens, then becomes progressively weaker and initially moves towards the apex and then down the wing as the panels are moved farther outward into the junction space between the strake and wing.

An increase in the delay of the burst point results in increased lift compared to the baseline configuration, while promotion of bursting closes to the apex leads to reductions in lift. Thus, the different configurations added to the wing provided by the selective deployment of the panels change the wing planform and leading edge geometry at strake/wing junction and alter the lift. This provides for enhanced moments, which can be used for increased maneuverability.

More specifically, the applicant has devised an active vortex control system for a fighter-type aircraft having a fuselage, a strake or a chined forebody, and a main wing, comprising: a deployable airfoil occupying the angular space between the strake and the main wing at their junction, the airfoil comprising a pair of panels which are selectively movable between stowed and deployed positions. The panels are withdrawn completely within the strake and the wing when in the stowed position. The panels overlap and extend forward from the strake and the wing, providing an added leading edge airfoil surface when in the deployed position. A front panel is affixed to and supported within the strake, and a rear panel is affixed to and supported within the main wing. Both panels are slideably and rotatably affixed, and the position of the panels is constrained by pins affixed to the aircraft which pass through slots in each panel. The planform of each panel is symmetrically identical and the movements of the panels are mechanically coordinated so that the exposed planform shape represented by the panels which extend forward from the strake and wing are symmetrical about a line which bisects the strake/wing junction angle.

In one position, the deployment of the panels together represents an exposed planform added to the original strake/wing junction angle which results in three shallow junction angles along the leading edge transition line between the strake and the main wing; one angle formed between the strake and the leading edge of the front panel; a second shallow junction angle formed between the leading edge of the front panel and the leading edge of the rear panel; and a third shallow junction angle formed between the leading edge of the rear panel and the main wing, the three shallow junction angles approximating a curved, continuous leading edge transition between the strake and the main wing. The panels may also be deployed in a position such that the straight line leading edges of both panels are co-linear so that together they present a single straight line leading edge transition between the strake and the main wing. In yet another position, the panels overlap and their combined exposed planform forms a diamond-shaped airfoil with two leading edges which occupy the strake/wing junction area. The panels are located at the strake/wing junctions on both sides of the aircraft and the left-side pair is independently deployable from the right-side pair.

It is therefore the primary object of the present invention to provide a high performance aircraft with an active vortex control system to selectively change the aerodynamic lift of the wings.

It is another object of the present invention to create a vortex control system which is activated on demand and which is stowable when not in use. Hence, the system will not adversely impact the cruise in efficiency or observability characteristics of the aircraft.

It is yet another object of the present invention to provide a high performance aircraft with retractable panels located at the strake/wing junction in order to selectively control the vortex shedding over the wing.

It is a further object of the present invention to provide a high performance aircraft with an active vortex control system which is asymmetrically deployable to enhance aircraft maneuverability.

Other objects, advantages and novel features of the invention will become apparent from the following detailed description of the invention when considered in conjunction with the accompanying drawings herein.

BRIEF DESCRIPTION OF THE DRAWINGS

FIGS. 1A, 1B, 1C, and 1D are diagrams which illustrate various strake/wing junction geometries and their effect on the vortex shedding process of the air flow over the wing.

FIGS. 2A, 2B, 2C and 2D are diagrams of different wing planforms at the strake/wing junction showing the invention at four different positions of deployment.

DETAILED DESCRIPTION OF THE PREFERRED EMBODIMENT

Figure 1D:
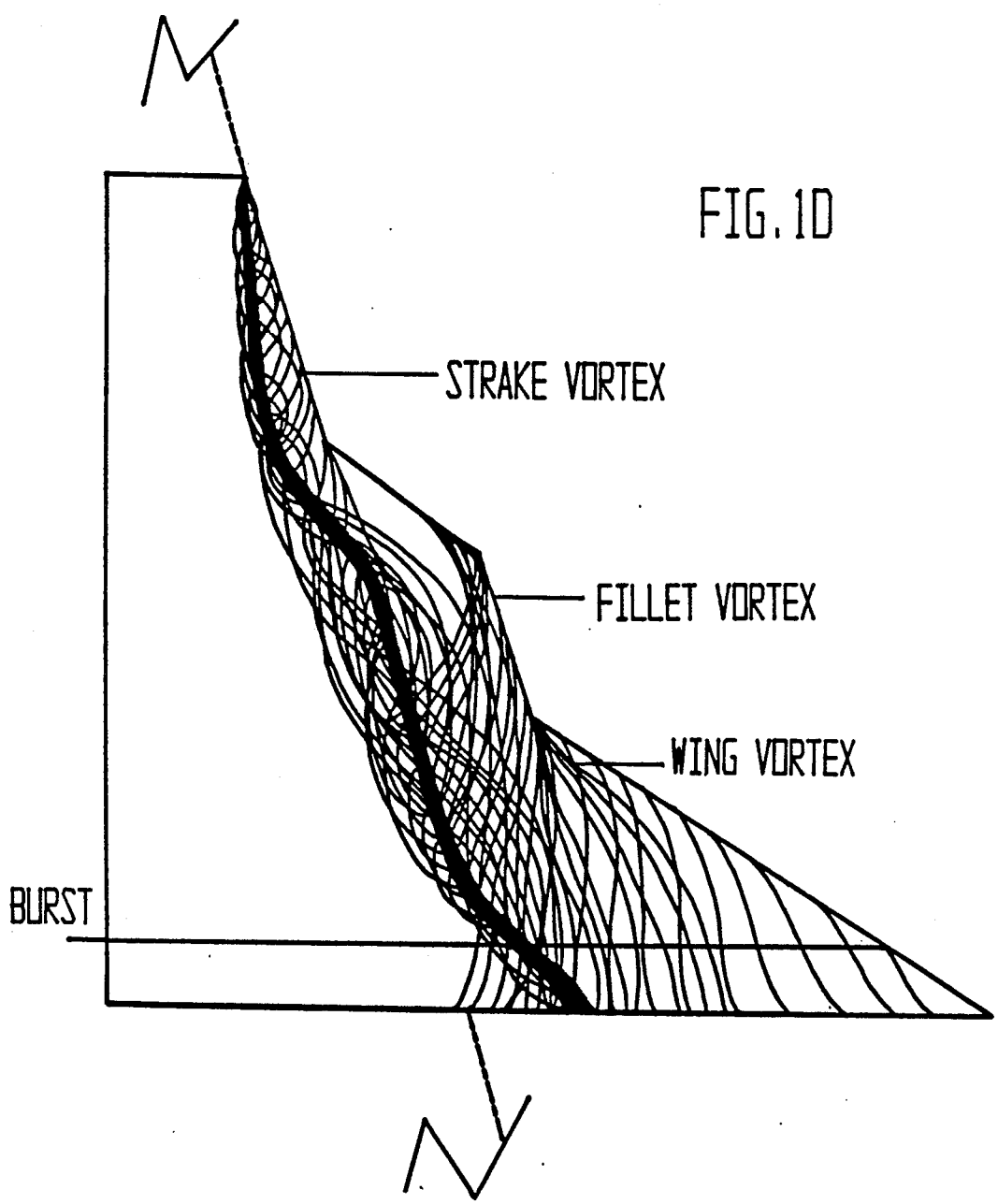
Figure 2A:
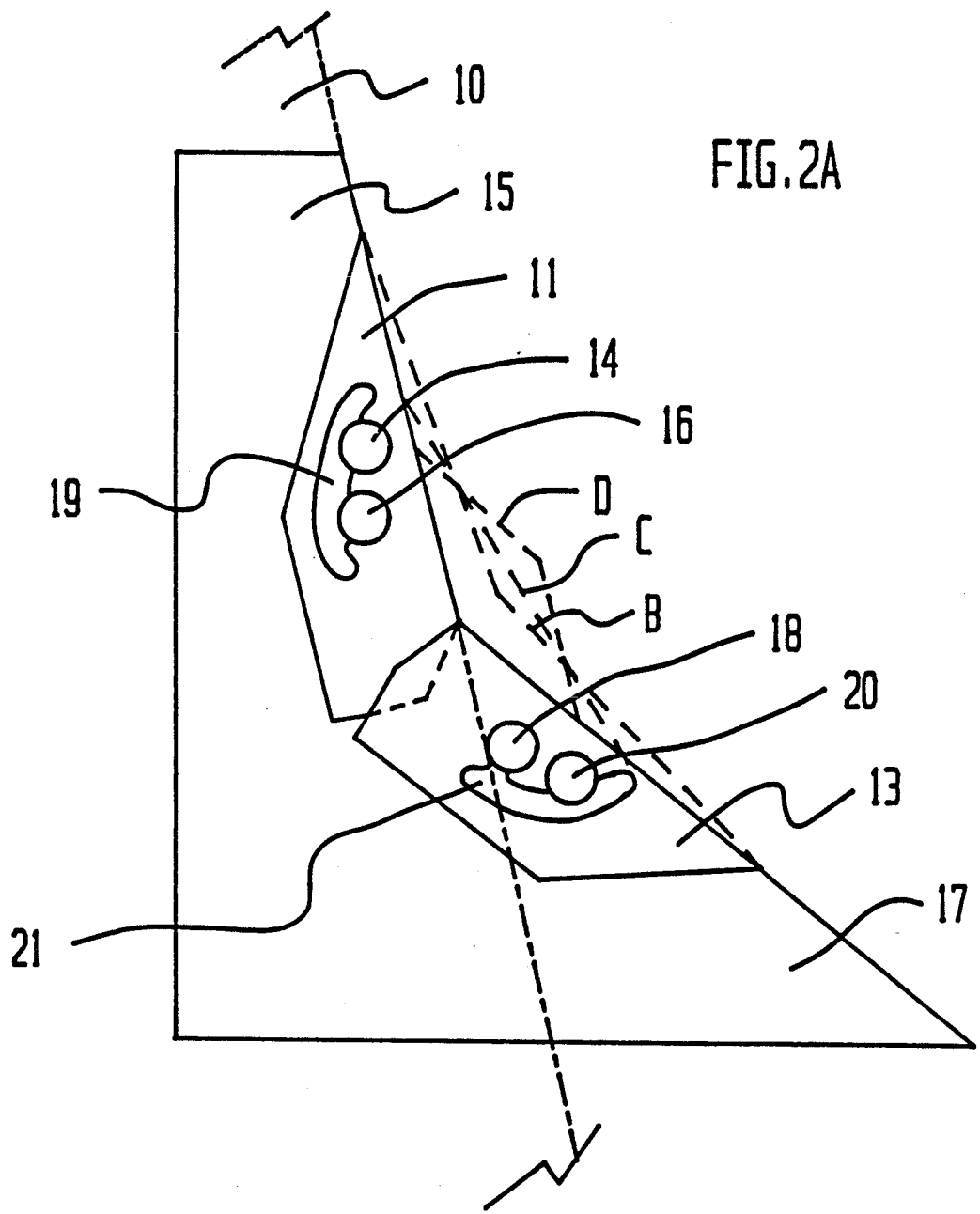

The preferred embodiment of the invention is shown in FIG. 2A. The panels are further shown in various deployed positions in FIGS. 2B, C and D in order of their extent of deployment. The FIGS. 2A, B, C, and D correspond to the flow-tested shapes shown in FIGS. 1A, B, C, and D respectively.

Referring now to FIG. 2A, a diagram representing a top view of the right side of a delta wing aircraft, including strake 15, main wing 17, and fuselage 10 is shown. The vortex control panels of the present invention are shown in their stowed position. Front panel 11 is retracted fully within the leading edge of strake 15 and rear panel 13 is fully retracted within the leading edge of wing 17. The dotted lines B, C and D extending between the leading edges of the strake and wing represent various fixed deployment positions. These will be further described with regard to FIGS. 2B, C and D which represent combined planforms added to the original strake/wing geometry in order of their extent of deployment.

Throughout their range of motion, each panel is mechanically constrained by pins 14 and 16 which are affixed to the strake, and pins 18 and 20 which are affixed to the wing structure. Each pin includes an enlarged head which restricts movement of each panel vertically, but yet allows them to move throughout a selective range of motion within slot means 19 of the front panel and slot means 21 of the rear panel. The positioning of the slots in both panels are symmetrical. The movements of the panels are mechanically coordinated so that the various planform shapes presented at the strake/wing junction are symmetrical about a line which bisects the strake/wing junction angle. Various mechanisms well-known in the arts may be employed to move and hold the panels in their various positions as described in this preferred embodiment.

Figure 2B:
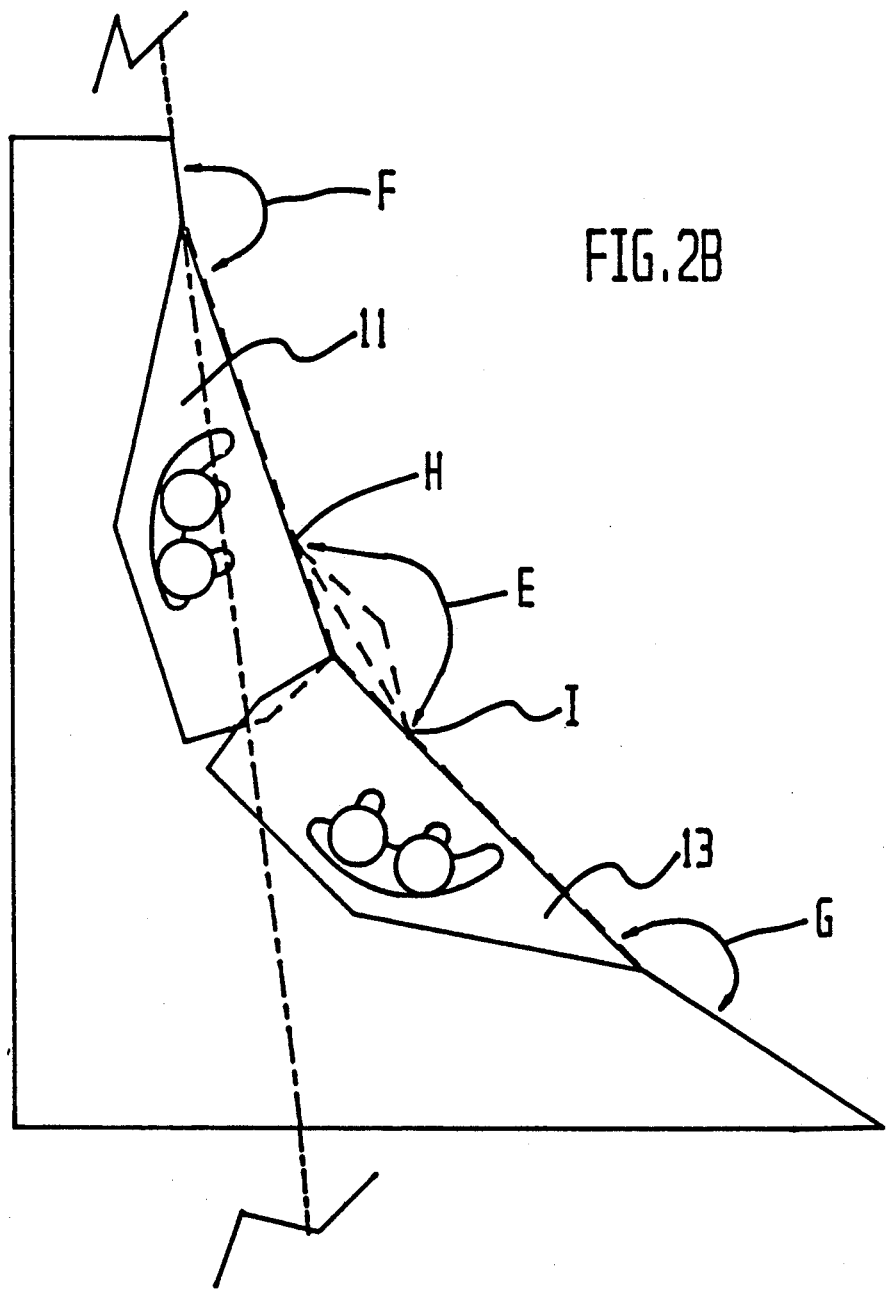
Figure 20:
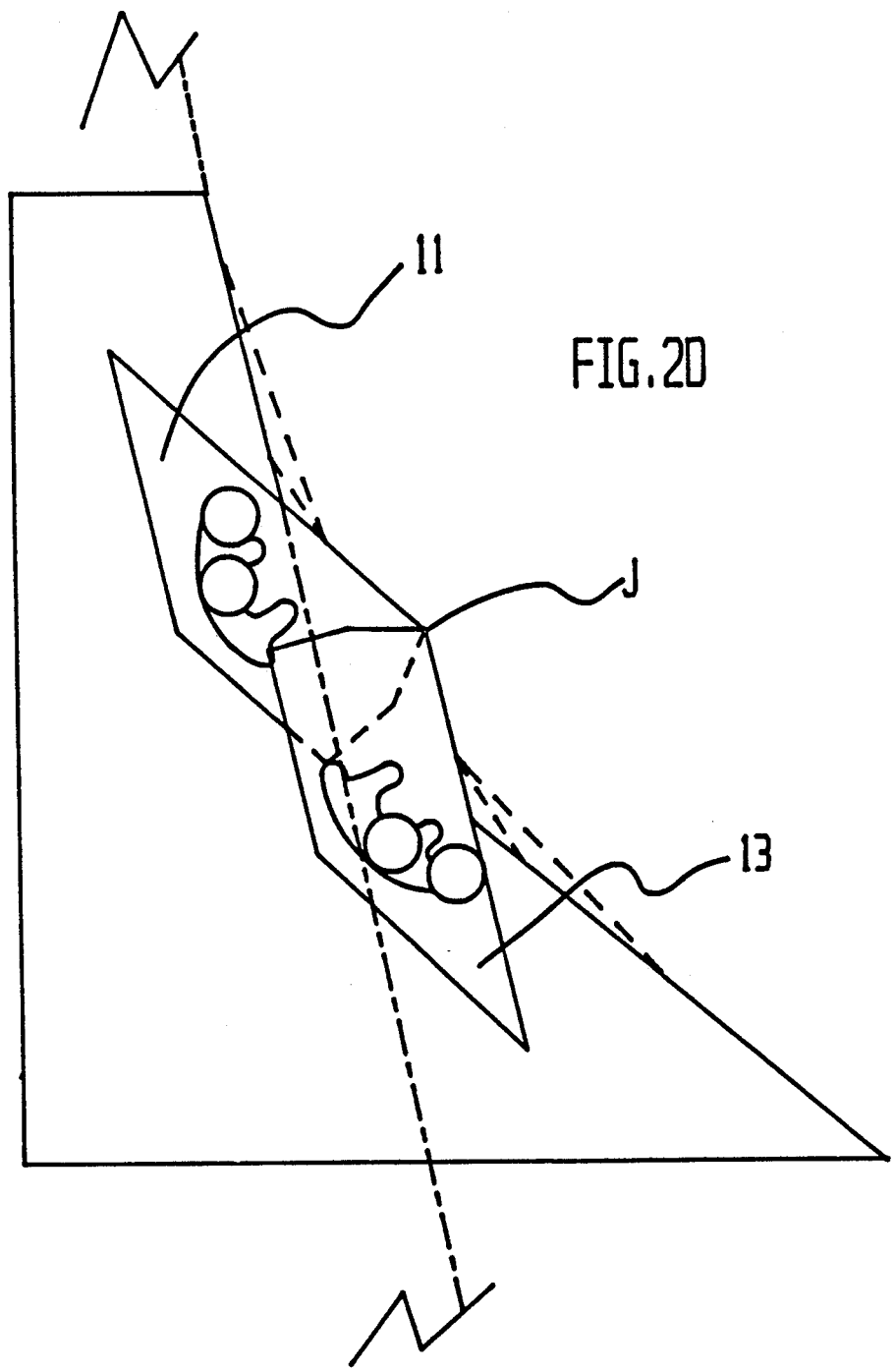

Referring now to FIG. 2B, the panels 11 and 13 are deployed in a position where the panels intersect at a junction angle E (included angle between the panels) which is much greater (shallower) than the included angle of the baseline strake/wing junction. This position of deployment further creates additional shallow junction angles F and G where the front panel meets the strake and the rear panel meets the main wing. In this case, a more continuous leading edge transition between the strake and wing is achieved, thus eliminating the sharp junction angle of the original wing planform with the panels in their stowed position. Compared to FIG. 1B, this results in a single, much stronger vortex being shed than the baseline vortex. Also, the stronger vortex creates a burst point closer to the apex of the wing.

FIG. 2C shows another position corresponding to the performance of the wing/strake planform geometry illustrated in FIG. 1C. In this position, the leading edges of both the front strake panel 11 and rear wing panel 13 are in alignment, and together they present a straight line leading edge transition between point H on the strake and point I on the wing. In reference to the air flow of the corresponding configuration shown in FIG. 1C, this position of the panels creates an additional weaker vortex and delays the burst point, compared to the vortex flow shown in FIG. 1B which corresponds to the prior position of the panels shown in FIG. 2B.

Referring now to FIG. 2D, the front and rear panels 11 and 13 are moved yet farther forward so that the corners of the panels meet at point J. The resulting exposed planform forms a diamond-shaped airfoil which now occupies the strake/wing junction area. This position of the panels corresponds to FIG. 1D from which it can be seen from the additional junction being created that a second vortex is now being shed. The resultant vortex shedding is even weaker than the previous one shown in FIG. 1C, and therefore the burst point is delayed even farther.

It will be readily understood, therefore, that the utilization of the leading edge strake and wing vortex control panels described above may change the leading edge configuration of the strake/wing junction so that the planform geometries presented in FIGS. 1A through 1D have been achieved. By selectively deploying the panels as described above, the strength and location of the vortex burst point which alter the lift on the wing may be actively controlled. Furthermore, if the vortex control panels are deployed asymmetrically, that is on one side only, this will create a moment about the roll axis which may be utilized to enhance maneuverability of the aircraft. Thus, the various objects and advantages over the prior art discussed above have been achieved.

Many modifications and variations of the present invention are possible in view of the above disclosure. It is therefore to be understood, that within the scope of the appended claims, the invention may be practiced otherwise than as specifically described.

What we claim is:

1. An active vortex control system for a high performance aircraft having a fuselage, a strake, and a main wing, comprising:
    a deployable airfoil occupying the angular space between the strake and the main wing at their junction when deployed, said airfoil comprising a pair of panels which are selectively movable between stowed and deployed positions; and
    said panels withdrawn completely within said strake and said wing when in the stowed position, and said panels extending forward from said strake and said wing providing a leading edge airfoil surface when in the deployed position.

2. The vortex control system of claim 1, further described in that said panels include a pair of overlapping panels, a front panel affixed to and supported within said strake, and a rear panel affixed to and supported within said main wing.

3. The vortex control system of claim 2, wherein said panels are slideably and rotatably affixed to said strake and said wing.

4. The vortex control system of claim 3, wherein the position of the panels is constrained by pins affixed to said aircraft which pass through slots in each panel.

5. The vortex control system of claim 4, wherein the planform of each of the panels is symmetrical.

6. The vortex control system of claim 5, wherein the movements of the panels are mechanically coordinated so that the combined planform shape of the overlapping exposed panels which extend forward from the strake and wing are symmetrical about a line which bisects the junction angle between the strake and the wing.

7. The vortex control system of claim 1, wherein the deployment of said panels represents a combined planform added to the original junction angle between the strake and the wing which results in three shallow junction angles along the leading edge transition line between the strake and the main wing; a first shallow angle formed between the strake and a leading edge of the front panel; a second shallow junction angle formed between the leading edge of the front panel and the leading edge of the real panel; and a third shallow junction angle formed between the leading edge of the rear panel and the main wing, said three shallow junction angles approximately a continuous, curved leading edge transition between said strake and said main wing.

8. The vortex control system of claim 1, wherein said panels are deployed in a position such that the straight line leading edges of both panels are co-linear so that combined they present a single straight line leading edge transition between the strake and the main wing.

9. The vortex control system of claim 1, wherein said panels are deployed into a position wherein the panels' combined exposed planform forms a diamond-shaped airfoil with two leading edges which occupies the junction area between the strake and the wing.

10. The vortex control system of claim 6, wherein said panels air located at the junctions between the strake and the wing on both sides of the aircraft and said left-side pair is independently deployable from said right-side pair.

* * * * *